(No Model.)
H. FLOYD.
SAW BUCK.
No. 274,304. Patented Mar. 20, 1883.
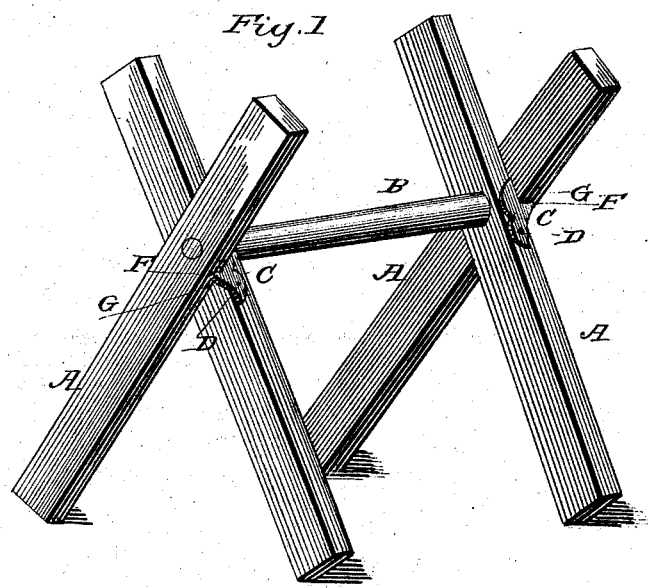
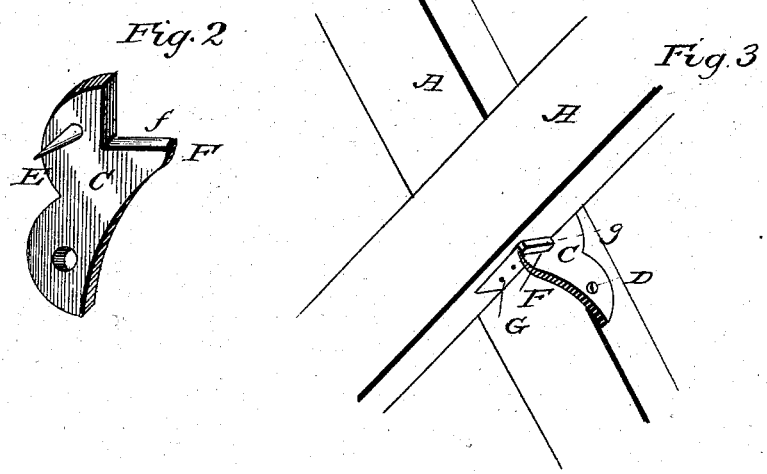
WITNESSES:
Fred. G. Dieterich.
J. G. Hinkel
Halleck Floyd,
INVENTOR.
By Louis Bagger & Co
ATTORNEYS.

UNITED STATES PATENT OFFICE.

HALLECK FLOYD, OF DUBLIN, INDIANA, ASSIGNOR OF ONE-HALF TO GEORGE W. CHAMP, OF SAME PLACE.

SAW-BUCK.

SPECIFICATION forming part of Letters Patent No. 274,304, dated March 20, 1883.

Application filed December 27, 1882. (No model.)

*To all whom it may concern:*

Be it known that I, HALLECK FLOYD, of Dublin, in the county of Wayne and State of Indiana, have invented certain new and useful Improvements in Saw-Horses; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved saw-horse. Fig. 2 is a detail view, and Fig. 3 is a similar view of a modification of the same.

Similar letters of reference indicate corresponding parts in all the figures.

My invention has relation to saw-horses; and it consists in the improved construction of parts of the same, as hereinafter more fully described and claimed.

In the accompanying drawings, the letter A indicates the legs of the saw-horse, which are of the usual construction, and pivoted upon the ends of the cross-bar B. Each leg has a plate, C, fastened near the inner edge upon that side which faces upward when the legs are spread. Each of these plates is fastened to the legs by means of a screw or bolt, D, and a lug or stud, E, or by means of screws or bolts projecting from the under side of the plate, which are driven into the leg and the plate secured by the screw or bolt D. From the inner edges of these plates project lips F, the upper edges, *f*, of which are straight and beveled to the angle of the inclination of the legs, the under sides of which bear upon these lips, preventing the legs from spreading farther.

A plate, G, of metal, may be placed flush with the surface of the leg at the point where the leg rests upon lips F, to prevent the metallic lip from cutting into the wood, and said plate may, if desired, as shown in Fig. 3, be provided with a small offset or projection, *g*, against which the lip bears.

Having thus described my invention, I claim and desire to secure by Letters Patent of the United States—

The saw-horse consisting of the legs A, pivoted upon the ends of cross-bar B, and having plates C, having lugs E and lips F fastened upon their upper sides by means of screws or bolts D, their lower sides bearing against the beveled upper edges of plates C, substantially as and for the purpose shown and set forth.

In testimony that I claim the foregoing as my own I have hereunto affixed my signature in presence of two witnesses.

HALLECK FLOYD.

Witnesses:
GEORGE W. CHAMP,
ALPHEUS G. COMPTON.